United States Patent [19]

Olson

[11] Patent Number: 4,714,604

[45] Date of Patent: Dec. 22, 1987

[54] METHOD OF SEPARATING HF AND SIF$_4$ FROM HCL

[75] Inventor: Robert S. Olson, Lafayette, Calif.

[73] Assignee: The Dow Chemical Company, Midland, Mich.

[21] Appl. No.: 896,165

[22] Filed: Aug. 13, 1986

[51] Int. Cl.$^4$ ............................................... C01B 7/07
[52] U.S. Cl. ..................... 423/488; 423/240; 423/341; 423/466; 423/483; 423/489; 55/71; 203/50
[58] Field of Search ............... 423/488, 494, 483, 341, 423/344, 240, 466, 489; 55/71; 203/50

[56] References Cited

U.S. PATENT DOCUMENTS

| | | | |
|---|---|---|---|
| 2,343,462 | 3/1944 | Laird et al. | 203/50 |
| 2,345,696 | 4/1944 | Benning et al. | 55/71 |
| 2,526,776 | 10/1950 | Smith et al. | 423/489 |
| 2,526,777 | 10/1950 | Smith | 423/483 |
| 2,568,889 | 9/1951 | Hanson et al. | 203/50 |
| 2,594,554 | 4/1952 | Hanson et al. | 423/483 |
| 3,079,230 | 2/1963 | Fedoruk | 203/50 |
| 3,273,963 | 9/1966 | Gunn, Jr. | 423/483 |
| 4,008,130 | 2/1977 | Leathers et al. | 423/341 |
| 4,009,214 | 2/1977 | Sze et al. | 423/488 |
| 4,083,941 | 4/1978 | Jayawant et al. | 423/488 |
| 4,092,403 | 5/1978 | Rectenwald et al. | 423/488 |
| 4,128,626 | 12/1978 | Merchant | 423/488 |
| 4,268,492 | 5/1981 | Sardisco et al. | 423/341 |
| 4,317,805 | 3/1982 | Robota et al. | 423/481 |
| 4,419,334 | 12/1983 | Karger | 423/483 |
| 4,557,921 | 12/1985 | Kirsch et al. | 423/488 |

*Primary Examiner*—Andrew H. Metz
*Assistant Examiner*—Anthony McFarlane

[57] ABSTRACT

A method of separating HF from a mixture including HF and HCl is disclosed wherein the mixture is contacted with silica causing the HF to react with the silica to form SiF$_4$. The concentration of HCl is increased thereby increasing the relative volatility of SiF$_4$/HCl. The SiF$_4$ is then removed as an aqueous distillate. The concentration of the HCl can be increased by various methods including adding gaseous or concentrated HCl to the mixture or by distilling off a portion of the water to thereby increase the concentration of the HCl. This method provides an efficient method of removing SiF$_4$ and HF from HCl.

20 Claims, 3 Drawing Figures

METHOD OF SEPARATING HF AND SIF₄ FROM HCL

BACKGROUND OF THE INVENTION

The present invention relates to a method of separating HF from HCl. The present invention also relates to a method of separating SiF₄ from HCl.

More particularly the present invention relates to method of separating HF from HCl by converting the HF to SiF₄ and subsequently separating the formed SiF₄ from the HCl by distillation/absorption in an aqueous system.

Many industrial processes produce, as an unwanted by-product, a waste gas or liquid comprising HCl and HF. For example in the incineration of plastics, a weak aqueous solution of HCl and HF is obtained. A large quantity of HCl is produced as a waste by-product in the production of Freon. This waste HCl contains significant quantities of HF. Typically a portion of the HCl is recovered from the mixture by low temperature distillation. However, due to the difficulty of separating HCl from HF, a large amount of waste HCl contaminated with HF remains. In the past HCl containing HF has been sold as a very low grade HCl. The HF contamination in the HCl makes it unsuitable for many applications and the ultimate user must contend with the fact that HF is by definition a toxic substance.

There are many methods of treating HCl and HF to remove one component or the other. For example, Rectenwald el al U.S. Pat. No. 4,092,403 discusses a process of purifying hydrogen chloride containing HF by contacting the HCl with alumina to sorb fluoride compounds.

Gunn, Jr. U.S. Pat. No. 3,273,963 discloses removing HF from HCl by converting the HF to SiF₄ and evaporating off the HCl in the presence of a suppressant. Further, Smith et al U.S. Pat. No. 2,526,776 discloses removing hydrogen fluoride from hydrogen chloride by passing the HF-HCl mixture over silica to form silicon tetrafluoride. Subsequently, the silicon tetrafluoride is sorbed on Fuller's Earth. Similar methods are disclosed in Sze U.S. Pat. No. 4,009,214 and Laird U.S. Pat. No. 2,343,462.

The primary method currently employed to remove hydrogen fluoride from HCl is to sorb it in calcium chloride or aluminum chloride as is disclosed in Robota et al, U.S. Pat. No. 4,317,805.

In general, although these references do disclose various separation techniques they are ineffective due to the low relative volatility of HF v. HCl and silicon tetrafluoride v. HCl. In fact, the Rectenwald reference teaches that silicon tetrafluoride is difficult to remove from HCl. It is for this reason that HCl contaminated with HF is sold as a very low grade acid with relatively little profit for the seller.

SUMMARY OF THE INVENTION

This invention is premised on the realization that increasing or fortifying the concentration of HCl changes the relative volatility of SiF₄/HCl to provide for a relatively efficient separation of the SiF₄ from the HCl whereas with low concentrations of HCl the relative volatility SiF₄/HCl is less than 1 preventing an efficient separation.

The present invention includes the method of separating HF from HCl by converting the HF to SiF₄ and subsequently separating the SiF₄ by distillation. This is accomplished by simply contacting the HF with silica (SiO₂) Upon contact the HF reacts with the SiO₂ to produce water and SiF₄. The SiF₄ can then be removed from the HCl by distillation.

In particular, the present invention includes the process for removing the SiF₄ from HCl by establishing the HCl concentration sufficiently high to permit distilling off the SiF₄. The relatively pure aqueous solution of HCl is recovered from the bottom of the distillation apparatus with a weak acid solution containing most of the SiF₄ removed as the distillate.

This process permits the recovery of relatively pure HCl suitable for use for sale as in industrial grade chemical and avoids the need for selling the HCl contaminated with HF. The present invention provides relatively efficient separation without the need for sorbants or suppressents.

Other objects and advantages of the present invention will be appreciated in light of the following detailed description and drawings in which:

DETAILED DESCRIPTION

According to the present invention fluoride impurities, SiF₄ and HF, are removed from HCl by a distillative process to purify or upgrade the quality of the HCl.

The fluoride tainted HCl can be from a variety of sources, generally, including the gaseous waste stream from Freon production or waste acid produced by incineration of plastics, such as polyvinyl chloride and the like. As in most cases the HCl will include hydrogen fluoride as an impurity. The present invention provides for removal of HF from either a dilute aqueous solution of HCl/HF or a gaseous stream of HCl/HF. The concentration of HF is not significant with respect to this separation. However, when the concentration of HF or SiF₄ equals or exceeds the HCl concentration there are other more efficient and economical separation methods.

According to the initial step of the present invention the HF impurity in the HCl is converted to SiF₄ according to the following reaction:

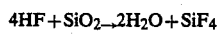

$$4HF + SiO_2 \rightarrow 2H_2O + SiF_4$$

The water content of the mixture of HF and HCl can range from 0% to about 99%. The water content does not effect the silicon tetrafluoride formation reaction. This reaction occurs spontaneously and is exothermic. It is conducted by simply passing or pumping the HF/HCl mixture through a bed of silica. Upon contacting the silica, the HF will react to produce a mixture of silicon tetrafluoride, and water. The silicon tetrafluoride containing reaction mixture is passed to a distillation column where the silicon tetrafluoride is distilled from the HCl.

The silica, can comprise amorphous silica powder or silica minerals like christobolite and quartz. Any source of silica, including silicate minerals like the feldspar, which does not provide any undesirable impurities can be used in the present invention.

The silicon tetrafluoride reaction is exothermic occurring spontaneously at ambient temperature. Higher temperatures may be used. At ambient pressure with an aqueous system the temperature must be maintained at less than 100° C. However, if the reaction is conducted at superatmospheric pressure or if the reaction is conducted in a vapor phase, the temperature can be substantially higher, basically up to the decomposition point of any of the reactants. For practical purposes the formation of the silicon tetrafluoride is conducted at ambient pressure at between about 20° C. to 100° C.

Figure 1:
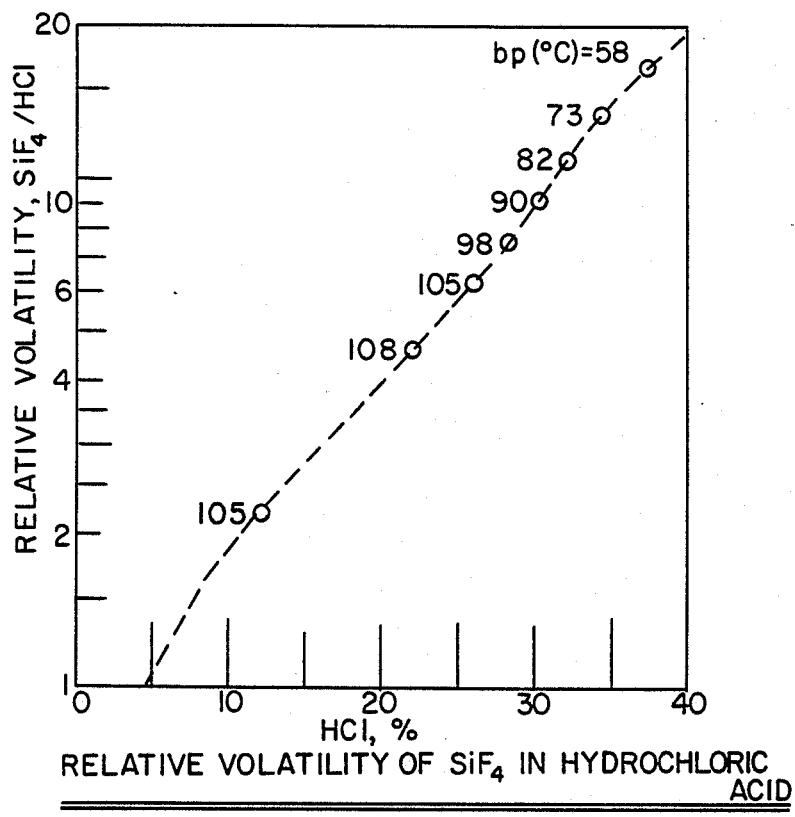
FIG. 1 is a graphical depiction of the relative volatility SiF₄/HCl v. HCl concentration.

The formed silicon tetrafluoride is then separated from the HCl by thermodynamic separation techniques. The relative volatility of the $SiF_4$ to the HCl must be sufficiently high to provide for an efficient separation of the $SiF_4$ from the HCl. FIG. 1 is a graph showing the relative volatility of $SiF_4$ to HCl at various concentrations of HCl at ambient pressure. To separate $SiF_4$ from HCl the relative volatility must be above 1. Accordingly, the concentration of HCl must be above about 5%. It is preferable, however, to conduct the present reaction at substantially higher HCl concentrations. For this reason it is preferable to establish the HCl concentration of the HCl/$SiF_4$ mixture at substantially above 5%. The constant boiling water azeotrope of HCl which is 22.2% provides certain advantages. At this concentration the relative volatility is 4.6 enabling the $SiF_4$ to be easily distilled from the HCl. Further, HCl loss is minimized at this concentration.

When the $SiF_4$/HCl concentration is established so that the relative volatility is greater than 1, the $SiF_4$ can be separated by thermodynamic separation techniques including distillation methods such as stripping, rectifying and combinations as well as other separation techniques such as blow out.

The HCl concentration can be established at above 5% by various means. The simplest of course, is to start with a solution of HCl having a concentration greater than 5%, preferably greater than about 20% HCl. When a gaseous source of HCl/HF is the starting material it can be dissolved in water to form the desired concentration of acid prior or subsequent to reacting with the silica. More preferably the gas is first reacted with silica and the silicon tetrafluoride HCl mixture should then be dissolved in water in a distillation column to provide the effective concentration of HCl. Accordingly, by control of the amount of water one can control the concentration or establish the concentration of the HCl at a desired level.

With weak aqueous solutions which are typically produced as a waste by-product from plastic incineration, the HCl concentration may need to be fortified by adding concentrated HCl or by dissolving gaseous HCl in the aqueous solution.

Further, the HCl concentration can be increased by distillation. When a dilute aqueous solution of HCl/$SiF_4$ is distilled, a water rich distillate would normally be produced. As the distillation continues the HCl concentration will build up in the bottom and the relative volatility ($SiF_4$/HCl) will increase. Then the $SiF_4$ can be distilled from the HCl.

Once the hydrogen chloride concentration is established at a sufficient concentration to provide a relative volatility greater than 1, the $SiF_4$ can be removed from the system by distillation.

The relative volatility as shown in FIG. 1, was determined emperically at ambient pressure. At super or subatmospheric pressures the relative volatility will change and the desired effective concentration of HCl will change.

In the distillation according to the present invention, the $SiF_4$ will be collected as the distillate in a weak acid solution. The bottoms product will be a concentrated HCl having minimal fluoride contamination. One particular example of a system according to the present invention is shown in FIG. 2 which is a diagramatic depiction of a distillation system according to the present invention and is further explained in the following example.

EXAMPLE 1

Figure 2:
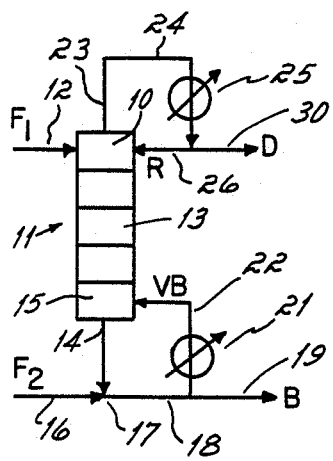
FIG. 2 is a diagramatic depiction of a separation conducted according to the present invention.

As shown in FIG. 2, and aqueous mixture of HCl/$SiF_4$ (22% HCl) is pumped into the top portion 10 of the distillation column 11 through feed line 12. For purposes of this example the HCl includes 2860 ppm $SiF_4$. This impure feed then passes downwardly through the gas vapor contact area 13 of the distillation column 11. Stripped bottom product is collected through bottom line 14. This stripped product is mixed with 100% HCl gas at a mixing valve 17. The HCl concentration of the bottom product is thereby increased.

This higher concentration HCl is directed through line 18 where a portion of the acid is taken off through the HCl recovery line 19 and an additional portion is directed through reboiler 21 and into a bottom portion 15 of the distillation column 11 through line 22. The reboiler 21 heats the higher concentration HCl providing a vapor stream of aqueous HCl which then rises upwardly through the gas vapor contact area 13 of column 11 contacting downwardly flowing HCl. The upwardly flowing vapor strips $SiF_4$ from the aqueous HCl. The top product exiting through port 23 contains a high concentration of $SiF_4$ and a relatively low concentration of HCl.

This top product passes through line 24 to condenser 25 where a portion of the condensed top product is directed through line 26 into the top portion 10 of the distillation column to provide reflux. The remainder of the top product is the distillate which passes from apparatus 11 through line 30.

The separation conditions are set forth in Table I for the system wherein the feed through line 12 is 22% HCl pumped at 100 lbs. per hour. Feed through line 16 is 100% HCl gas pumped at 15 lbs. per hour. The reboiler 21 is operated at 80° C. The distillate product passing through port 23 and through line 24 is condensed at a temperature of 7.2° C. The collected products are the distillate which is 4.43% HCl flowing at 3.3 lbs. per hour and the bottoms product 31.8% HCl flowing at 111.7 lbs. per hour.

As is indicated by data contained in Table I the $SiF_4$ concentration of the bottom product is about 0.007 ppm.

TABLE I
DISTILLATION COLUMN DATA

| | Location | | Reboiler | Tray 1 | Tray 2 | Tray 3 | Tray 4 | | Cond. | Feed F$_1$ | F$_2$ |
|---|---|---|---|---|---|---|---|---|---|---|---|
| | Temp | | 80.0 | 101.2 | 106.9 | 109.4 | 110.7 | | 7.2 | | |
| Calculated | Liquid | | | | | | | D | 3.3 | | |
| for HCl—H$_2$O | Rate, lb/hr | B | 111.7 | 106.6 | 106.6 | 106.6 | 106.6 | R | 6.6 | 100 | 15 |
| | HCl, % | | 31.8 | 27.7 | 25.9 | 24.7 | 23.9 | | 44.3 | 22.0 | 100 |
| | H$_2$O % | | 68.2 | 72.3 | 74.1 | 75.3 | 76.1 | | 55.7 | 78.0 | 0 |
| | Vapor | | | | | | | | | | |
| | Rate, lb/hr | | 9.9 | 9.9 | 9.9 | 9.9 | 9.9 | | — | — | — |
| | HCl, % | | 90.6 | 71.1 | 58.6 | 50.1 | 44.3 | | — | — | — |
| | H$_2$O, % | | 9.4 | 38.9 | 41.4 | 49.9 | 55.7 | | — | — | — |
| Relative | | | 10.9 | 7.3 | 6.2 | 5.6 | 5.0 | | — | | |
| Volatility | | | | | | | | | | | |
| SiF$_4$/HCl | | | | | | | | | | | |
| Calculated | Liquid | B | 7.38 × 10$^{-7}$ | 2.36 × 10$^{-5}$ | 4.44 × 10$^{-4}$ | 0.00624 | 0.0708 | D | 0.286 | 0.286 | |
| using above | SiF$_4$ lb/hr | | | | | | | R | 0.572 | (2860 ppm) | |
| value for | SiF$_4$/HCl + | | 6.6 × 10$^{-7}$ | 2.2 × 10$^{-5}$ | 4.2 × 10$^{-4}$ | 0.0058 | 0.066 | | 8.7 | | |
| & assuming | H$_2$O, % | | (0.007 ppm) | | | | | | | | |
| SiF$_4$ does | Vapor | | | | | | | | | | |
| not change | SiF$_4$, lb/hr | | 2.29 × 10$^5$ | 4.43 × 10$^4$ | 0.00624 | 0.0708 | 0.858 | | — | | |
| HCl—H$_2$O | SiF$_4$/HCl + | | 2.3 | 0.0045 | 0.063 | 0.72 | 8.7 | | | | |
| L-V curve | H$_2$O, % | | | | | | | | | | |

HCl loss to distillate = 3.95%

Overall SiF$_4$ Rejection factor, $\frac{Fi}{B} = \frac{0.286}{7.4 \times 10^{-7}} = 4 \times 10^{-5}$ This separation is particularly satisfactory for use in the present invention. Further this separation method is particularly unique in that it employs gaseous HCl feed which is actually absorbed in the aqueous HCl solution. The heat of dissolution of the HCl improves thermodynamic efficiency in the separation. Further, this provides unique control of the HCl concentration in the distillation apparatus.

In FIG. 2 the flow through line 30 is designated by D, the flow through line 19 by B, the flow through line 22 as VB and the flow through line 26 by R.

EXAMPLE 2

Figure 3:
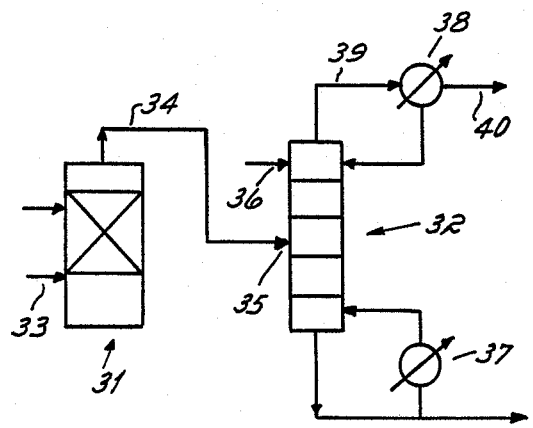
FIG. 3 is a diagramatic depiction of a separation conducted according to an alternate embodiment of the present invention.

FIG. 3 shows a second example of a distillation apparatus for conducting the present invention. This apparatus also incorporates a reactor to convert HF to SiF$_4$.

As shown there is a silica packed reactor 31 and distillation column 32. Gaseous dry HCl and HF feed enters the bottom of reactor 31 where it contacts silica. The HF reacts with the silica to produce SiF$_4$ and water. A mixture of HCl and SiF$_4$ with a minor amount of water exits port 34. This mixture passes through a feed inlet 35 into distillation column 32. A reboiler 37 is provided at the bottom of the distillation column 32 and a condenser 38 is provided at the top of column 32. Water is added at the top of the column through line 36.

In operation, gaseous HCl and HF is admitted into the bottom of reactor 31 through line 33 and the product HCl, SiF$_4$ and water passes from line 34 into the middle of the column at a gas inlet 35. Water is introduced through line 36 and flows downwardly absorbing the gas to form a aqueous solution of HCl and silicon tetrafluoride. The water rate is controlled to establish the desired concentration of HCl. This mixture flows downwardly and contacts heated vapors emitted from reboiler 37. The vapors from reboiler 37 pass upwardly contacting the downwardly flowing aqueous HCl and SiF$_4$. Below the feed 35 the HCl concentration increases and the vapors passing upwardly loose HCl. This increases the concentration of water as the vapor passes upwardly through the column. An aqueous distillate containing SiF$_4$ is removed through line 39 and 40 via condenser 38 which provides partial reflux.

According to this method the HF concentration of the feed can range up to about 10%. The bottom products would range from 22% to 40% HCl. The temperature in the distillation apparatus preferably will range from about 50° to 110° C. at ambient pressure.

The degree of purification is determined by the reflux ratio and the number of plates. For distillation of the HCl water azeotrope, six trays, four stripping and two enriching should yield around 95% recovery of the azeotrope with an SiF$_4$ reduction of about 99% from the feed.

The SiF$_4$ can also be separated by a blow out method where an inert gas, inert to the reactants, is passed through the SiF$_4$ HCl solution to entrain SiF$_4$ in the inert gas. Preferred inert gases would include, air, nitrogen and helium.

Thus, according to the present invention hydrogen fluoride can be removed from a gaseous mixture of HCl and HF by converting the HF to silicon tetrafluoride. By taking advantage of the change in the relative volatility of SiF$_4$/HCl as the concentration of HCl increases, one can efficiently thermodynamically separate the SiF$_4$ from the HCl to provide HCl dissolved in water substantially free from fluoride impurities.

What is claimed is:

1. A method of separating HF from a mixture of HF and HCl comprising contacting said mixture with silica thereby forming a mixture of SiF$_4$ and HCl, separating said SiF$_4$ by distillation and recovering said SiF$_4$ as an aqueous distillate product.

2. The method claimed in claim 1 comprising establishing a concentration of HCl in said mixture effective to provide a relative volatility SiF$_4$/HCl greater than 1.

3. The method claimed in claim 2 wherein said concentration is at least about 5% HCl.

4. The method claimed in claim 3 wherein said concentration is at least about 20% HCl.

5. The method claimed in claim 2 wherein said concentration of HCl is established by adding concentrated aqueous HCl to said mixture of HCl and SiF$_4$.

6. The method claimed in claim 2 wherein said concentration is established by separating water from said mixture by distillation.

7. The method claimed in claim 2 wherein said concentration is established by dissolving HCl gas in said mixture.

8. The method claimed in claim 1 wherein said mixture of $SiF_4$ and HCl comprises a gaseous mixture wherein said gaseous mixture is dissolved in water to provide a concentration of HCl effective to establish a relative volatility of $SiF_4$/HCl of at least about 1.

9. The method claimed in claim 8 wherein said concentration of HCl is greater than 5%.

10. A method of separating HF from a mixture of HF and HCl comprising:
   contacting said mixture with $SiO_2$ to form a mixture of $SiF_4$ and HCl;
   establishing an aqueous solution of $SiF_4$ and HCl having a concentration of HCl at a level effective to provide a relative volatility $SiF_4$/HCl at greater than 1;
   distilling said solution of $SiF_4$ and HCl to remove said $SiF_4$ from said HCl and
   collecting $SiF_4$ as an aqueous distillate; and
   collecting aqueous HCl as a bottom product.

11. The method claimed in claim 10 wherein said concentration of HCl of said aqueous solution is at least about 20%.

12. The method claimed in claim 10 wherein the level of said concentration of HCl is provided by adding gaseous HCl to the $SiF_4$ solution.

13. The method claimed in claim 12 further comprising refluxing at least a portion of said distillate.

14. A method of separating $SiF_4$ from an aqueous solution of HCl and $SiF_4$ comprising establishing a concentration of said HCl at a level effective to provide a relative volatility $SiF_4$/HCl greater than 1 and separating said $SiF_4$ from said aqueous solution by a distillation separation.

15. The method claimed in claim 14 further comprising adding HCl gas to a said solution to establish said effective concentration.

16. The method claimed in claim 15 comprising condensing a portion of said aqueous solution of $SiF_4$ and refluxing said portion.

17. The method claimed in claim 14 wherein said effective concentration is at least about 5%.

18. The method claimed in claim 14 wherein said $SiF_4$ is distilled from said aqueous solution and concentrated HCl is recovered as a bottom product.

19. The method claimed in claim 18 wherein said effective concentration is established by distilling off water from said aqueous solution of HCl and $SiF_4$.

20. The method claimed in claim 14 wherein said concentration of HCl is established by adding a concentrated solution of HCl to said aqueous solution of HCl and $SiF_4$.

* * * * *